United States Patent
Hodge

(10) Patent No.: US 11,178,273 B2
(45) Date of Patent: Nov. 16, 2021

(54) SYSTEM AND METHOD FOR DETECTING AND CONTROLLING CONTRABAND DEVICES IN A CONTROLLED ENVIRONMENT

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 16/884,901

(22) Filed: May 27, 2020

(65) Prior Publication Data

US 2020/0336586 A1    Oct. 22, 2020

Related U.S. Application Data

(63) Continuation of application No. 16/250,820, filed on Jan. 17, 2019, now Pat. No. 10,674,008, which is a
(Continued)

(51) Int. Cl.
*H04M 3/20*  (2006.01)
*H04W 4/02*  (2018.01)
(Continued)

(52) U.S. Cl.
CPC .......... *H04M 3/205* (2013.01); *H04L 61/605* (2013.01); *H04M 3/2281* (2013.01);
(Continued)

(58) Field of Classification Search
CPC ... H04M 3/2281; H04M 3/205; H04L 61/605; H04W 24/10
(Continued)

(56) References Cited

U.S. PATENT DOCUMENTS 4,598,810 A    7/1986  Shore et al.
4,866,661 A    9/1989  de Prins
(Continued)

FOREIGN PATENT DOCUMENTS

EP    0159359 A1    10/1985
EP    0239110 A2     9/1987
(Continued)

OTHER PUBLICATIONS

International Search Report and Written Opinion of the International Searching Authority directed to related International Patent Application No. PCT/US2017/054974, dated Oct. 19, 2017; 9 pages.
(Continued)

*Primary Examiner* — John J Lee
(74) *Attorney, Agent, or Firm* — Sterne, Kessler, Goldstein & Fox P.L.L.C.

(57) ABSTRACT

The present disclosure provides details of a system and method for detecting and monitoring a contraband device including communication devices by utilizing a combination of mobile devices, fixed monitoring devices, and a contraband monitoring center. The mobile devices include smart phones or tablets that are borrowed, rented, or purchased by an inmate from a correctional facility. These mobile devices are configured to detect, monitor, and intervene in the communications of target devices. Further, the mobile devices are configured to communicate with fixed monitoring devices located throughout the correctional facility in performing intervention operations. The contraband monitoring center may also be utilized in the coordination, monitoring, and intervention of target devices.

20 Claims, 7 Drawing Sheets

Related U.S. Application Data continuation of application No. 15/718,646, filed on Sep. 28, 2017, now Pat. No. 10,187,519, which is a continuation of application No. 15/286,294, filed on Oct. 5, 2016, now Pat. No. 9,900,428.

(51) Int. Cl.

| | | |
|---|---|---|
| H04M 3/22 | (2006.01) | |
| H04W 12/06 | (2021.01) | |
| H04W 24/00 | (2009.01) | |
| H04M 3/42 | (2006.01) | |
| H04W 24/10 | (2009.01) | |
| H04L 29/12 | (2006.01) | |
| H04W 88/06 | (2009.01) | |

(52) U.S. Cl.
CPC ....... *H04M 3/42059* (2013.01); *H04W 4/023* (2013.01); *H04W 12/06* (2013.01); *H04W 24/00* (2013.01); *H04W 24/10* (2013.01); *H04W 88/06* (2013.01)

(58) Field of Classification Search
USPC .............. 455/1, 67.11, 456.1, 422.1, 452.1
See application file for complete search history.

(56) References Cited

U.S. PATENT DOCUMENTS

| | | | |
|---|---|---|---|
| 4,951,308 A | 8/1990 | Bishop et al. | |
| 5,172,829 A | 12/1992 | Dellicker | |
| 5,678,200 A | 10/1997 | Levi | |
| 5,819,981 A | 10/1998 | Cox | |
| 5,940,764 A | 8/1999 | Mikami | |
| 6,201,973 B1 | 3/2001 | Kowaguchi | |
| 6,496,703 B1 | 12/2002 | da Silva | |
| 6,771,955 B2* | 8/2004 | Imura | H04W 88/02 455/420 |
| 6,799,052 B2 | 9/2004 | Agness et al. | |
| 6,799,084 B2 | 9/2004 | Grobler | |
| 6,830,160 B2 | 12/2004 | Risolia | |
| 6,880,754 B1 | 4/2005 | Lie-Nielsen et al. | |
| 6,896,145 B2 | 5/2005 | Higgins et al. | |
| 6,975,941 B1 | 12/2005 | Lau et al. | |
| 7,142,108 B2 | 11/2006 | Diener et al. | |
| 7,233,916 B2 | 6/2007 | Schultz | |
| 8,019,354 B2* | 9/2011 | Rae | H04W 64/003 455/456.1 |
| 8,078,190 B2 | 12/2011 | Noonan et al. | |
| 8,099,080 B1 | 1/2012 | Rae et al. | |
| 8,106,752 B2 | 1/2012 | Golden | |
| 8,175,577 B1 | 5/2012 | Harvey et al. | |
| 8,233,880 B2 | 7/2012 | Johnson et al. | |
| 8,238,936 B2 | 8/2012 | Nadler et al. | |
| 8,248,238 B2 | 8/2012 | Butler et al. | |
| 8,254,886 B2 | 8/2012 | Salkini et al. | |
| 8,311,892 B2 | 11/2012 | Junger | |
| 8,346,281 B2 | 1/2013 | Noonan et al. | |
| 8,365,868 B2 | 2/2013 | Johnson et al. | |
| 8,421,630 B2 | 4/2013 | Butler et al. | |
| 8,509,740 B2 | 8/2013 | Salkini et al. | |
| 8,509,818 B2 | 8/2013 | Schork et al. | |
| 8,583,078 B2 | 11/2013 | Sweeney et al. | |
| 8,606,229 B2 | 12/2013 | Johnson et al. | |
| 8,626,195 B2 | 1/2014 | Noonan et al. | |
| 8,750,903 B1 | 6/2014 | Fitzsimmons et al. | |
| 8,825,011 B2 | 9/2014 | Salkini et al. | |
| 8,981,925 B2 | 3/2015 | Chapin et al. | |
| 8,983,446 B2 | 3/2015 | Nadler et al. | |
| 9,295,071 B2 | 3/2016 | Salkini et al. | |
| 9,301,102 B2 | 3/2016 | Noonan et al. | |
| 9,313,639 B2 | 4/2016 | Salkini et al. | |
| 9,332,412 B2 | 5/2016 | Salkini et al. | |
| 9,332,520 B2 | 5/2016 | Nadler et al. | |
| 9,508,212 B2 | 11/2016 | Peters et al. | |
| 9,584,252 B1 | 2/2017 | Salyers et al. | |
| 9,681,360 B1 | 6/2017 | Salyers et al. | |
| 10,187,519 B2 | 1/2019 | Hodge | |
| 10,674,088 B2 | 6/2020 | Sun | |
| 2001/0036821 A1 | 11/2001 | Gainsboro et al. | |
| 2002/0036995 A1 | 3/2002 | Dalsgaard | |
| 2002/0094780 A1 | 7/2002 | Payton et al. | |
| 2002/0116208 A1 | 8/2002 | Chirnomas | |
| 2003/0017821 A1 | 1/2003 | Irvin | |
| 2003/0143943 A1 | 7/2003 | Kline | |
| 2004/0044697 A1 | 3/2004 | Nixon | |
| 2004/0253963 A1 | 12/2004 | Park et al. | |
| 2005/0211768 A1 | 9/2005 | Stillman | |
| 2006/0079218 A1 | 4/2006 | Aldridge et al. | |
| 2007/0041581 A1 | 2/2007 | Frost | |
| 2007/0159991 A1 | 7/2007 | Noonan et al. | |
| 2008/0005225 A1 | 1/2008 | Ferguson et al. | |
| 2008/0014966 A1 | 1/2008 | Chakraborty et al. | |
| 2008/0057976 A1 | 3/2008 | Rae et al. | |
| 2008/0168515 A1 | 7/2008 | Benson et al. | |
| 2010/0105416 A1 | 4/2010 | Nadler et al. | |
| 2010/0151820 A1 | 6/2010 | Mulherin et al. | |
| 2011/0093622 A1 | 4/2011 | Hahn et al. | |
| 2011/0258135 A1 | 10/2011 | Paul et al. | |
| 2012/0078413 A1 | 3/2012 | Baker | |
| 2012/0215347 A1 | 8/2012 | Illingworth et al. | |
| 2012/0248183 A1 | 10/2012 | Cook | |
| 2012/0295646 A1 | 11/2012 | Johnson | |
| 2013/0036018 A1 | 2/2013 | Dickerson | |
| 2013/0307533 A1 | 11/2013 | Keene et al. | |
| 2014/0066012 A1 | 3/2014 | Sweeney et al. | |
| 2014/0128023 A1 | 5/2014 | Guerra | |
| 2014/0148947 A1 | 5/2014 | Levesque et al. | |
| 2014/0194084 A1 | 7/2014 | Noonan et al. | |
| 2014/0297487 A1 | 10/2014 | Bashkin | |
| 2014/0367466 A1 | 12/2014 | Pai et al. | |
| 2015/0077221 A1 | 3/2015 | Peters et al. | |
| 2015/0363749 A1 | 12/2015 | Buscher | |
| 2016/0300409 A1 | 10/2016 | Peters et al. | |
| 2017/0048679 A1* | 2/2017 | Chao .................. H04L 63/14 | |
| 2017/0094534 A1* | 3/2017 | Salyers ............. H04W 12/1202 | |
| 2018/0097931 A1 | 4/2018 | Hodge | |

FOREIGN PATENT DOCUMENTS

| | | |
|---|---|---|
| EP | 2328130 A1 | 1/2011 |
| WO | WO 2007/137067 A2 | 11/2007 |
| WO | WO 2008/073566 A2 | 6/2008 |
| WO | WO 2012/174324 A1 | 12/2012 |

OTHER PUBLICATIONS

Supplementary European Search Report directed to related European Patent Application No. 17859038.6, dated Feb. 3, 2020; 7 pages.

"Controlling Wireless Abuse in Restricted Areas", Cell Block Technologies, Inc., www.cell-block-r.com, Prison Review International, Apr. 2002.

"No More 'Cell' Phones," TECHbeat, Winter 2005.

Cellbuster Cell Phone Detector, Cellbusters Mobile Security Products, Cellbusters.Com, Phoenix, Arizona, available Aug. 16, 2006.

Efstathiou et al., "The Mobile-Phone Silencers Controversy," Jan. 2002, Athens: Athens University of Economics and Business, Department of Computer Science, Mobile Multimedia Library, Jan. 2002; 4 pages.

Excerpts from the Prosecution History of U.S. Appl. No. 11/504,979, filed Aug. 16, 2006.

Excerpts from the Prosecution History of U.S. Appl. No. 13/562,057, filed Jul. 30, 2012.

GSM Pocket Cellular Phone Detector, www.cellular.co.za, accessed Oct. 6, 2005.

U.S. Appl. No. 60/602,838, filed Aug. 19, 2004.

Xu, et al., "The Feasibility of Launching and Detecting Jamming Attacks in Wireless Networks," Urbana-Champaign, IL, 2005,

(56) References Cited

OTHER PUBLICATIONS available at https://nslab.kaist.ac.kr/courses/2006/cs710/paperlist/security/35.pdf; 12 pages.

\* cited by examiner

SYSTEM AND METHOD FOR DETECTING AND CONTROLLING CONTRABAND DEVICES IN A CONTROLLED ENVIRONMENT

CROSS-REFERENCE TO RELATED APPLICATIONS

This application is a continuation of U.S. patent application Ser. No. 16/250,820, filed on Jan. 17, 2019, which is a continuation of U.S. patent application Ser. No. 15/718,646, filed on Sep. 28, 2017 (now U.S. Pat. No. 10,187,519), which is a continuation of U.S. patent application Ser. No. 15/286,294 filed on Oct. 5, 2016 (now U.S. Pat. No. 9,900,428), which are incorporated by reference herein in their entirety.

BACKGROUND

Field

The disclosure relates to a system and method for detecting and controlling contraband devices in a controlled environment.

Background

It is common practice in a corrections environment to record and/or monitor inmates' conversations. Such recording and monitoring takes place in the very controlled atmosphere of permitted inmate communications with individuals outside of the facilities housing prisoners or inmates. Normally prisoners are limited to a small number of individuals that they are permitted to call. These may include family members, their lawyers, and friends and may specifically exclude others, for example judges, jury members, witnesses, former co-conspirators and other like individuals to whom calls from a particular inmate may be of a harassing or other undesired nature. There may be a time of day, a length of call, three-way call or other restrictions on calls, all of which must be controlled by way of various instrumentalities that may include computer controlled equipment at the facility and/or at remote locations in addition to human monitoring and/or control. In almost all instances, such communications must be recorded; yet even in those instances, there are conditions that may impact on the desire, ability, or legal right to record such conversations. For example, it is inappropriate to record or monitor conversations between an inmate and his/her attorney, and thus, measures must be taken to insure that, where calls are made from an inmate to his/her attorney, no recording is made or monitoring is allowed.

While it is considered well-known that the recording of inmate communications is advantageous to governmental agencies and appropriate authorities in that information regarding the security of facilities and general continuing or past criminal activity may be found in such recordings, advances in the communications technology have opened avenues for inmates to circumvent such monitoring and/or recording advantages. Maintaining the ability to ensure control and/or monitoring of communications from or to a controlled facility is, therefore, an important aspect to previously implemented telecommunications systems. With the advances in cellular communications technology, maintaining security is hindered by such issues as the clandestine delivery of prohibited equipment into a monitored facility. Due to the small size of certain of the more recently-developed devices, such may avoid detection by more conventional search techniques including, but not limited to, walk through and manual metal detectors and even physical "pat-down" searches.

Conventionally, some correctional facilities have prevented the use of contraband cellular devices through the use of jamming devices or managed access devices (e.g., Stingray surveillance device manufactured by Harris Corporation) which emit a blanketing signal(s) around a correctional facility to prevent the use of any unauthorized cellular devices. However, these technologies are highly discouraged in most jurisdictions as they can interfere with public use of cellular phones when visiting or merely passing by the correctional facility. Despite the disadvantages of these jamming and monitoring technologies, they are occasionally used for a limited amount of time during emergency situations such as a riot.

While various aspects and alternative features are known in the field of communication monitoring, no one design has emerged that generally addresses the concerns of the prison industry, as discussed herein.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
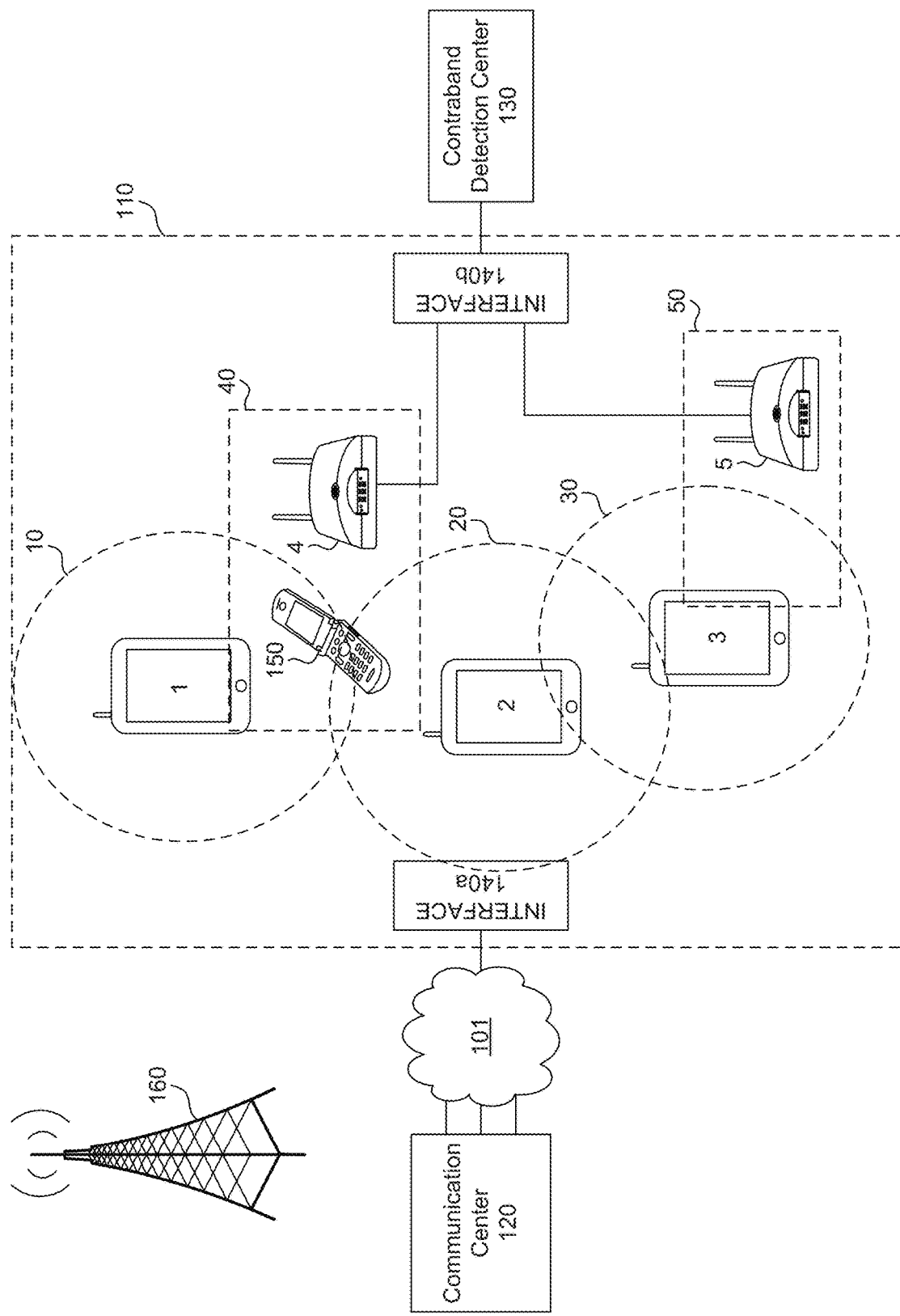
FIG. 1 illustrates a block diagram of a detection and monitoring system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

As discussed above, with the advances in communications technologies, correctional facilities have had difficulty in preventing the entrance and use of prohibited equipment. Due to the small size of certain of the more recently developed devices, such may avoid detection by more conventional search techniques. Further, once within, a correctional facility's ability to stop cellular device use is limited to insider tips and room searches, due to the limited if any use of jamming devices. Further, even when jamming devices are used inmates are able to circumvent conventional jamming technologies by using cellular devices in "dead" spots, or areas of the prison that are outside of zones where jamming and monitoring devices are effective in locating the cellular device.

In light of the above, the present disclosure provides details of a system and method for detecting and monitoring a contraband device including communication devices such as cellular phones by utilizing a combination of mobile devices, fixed monitoring devices, and a contraband monitoring center. The mobile devices include smart phones, tablets, or e-readers that are borrowed, rented, or purchased by an inmate from a correctional facility. In addition to performing traditional functions such as communications, these mobile devices are configured to detect, monitor, and intervene in the communications of target devices. Further, the mobile devices are configured to communicate with fixed monitoring devices located throughout the correctional facility in performing intervention operations. The contraband monitoring center may also be utilized in the coordination, monitoring, and intervention of target devices.

Detection and Monitoring System

FIG. 1 illustrates a block diagram of detection and monitoring system 100, according to embodiments of the present disclosure. As shown by FIG. 1, a number of mobile devices 1-3 are illustrated in a correctional facility 110. Mobile devices 1-3 are communication devices such as smart phones, tablets, e-readers, or other portable devices that are borrowed, rented, and/or purchased by inmates or workers, such as guards, from correctional facility 110 for communications with individuals outside of correctional facility 110 such as families, friends, counselors, or others with whom the inmates are permitted to communicate with. Mobile devices 1-3 are configured to transmit and receive authorized communications to/from outsiders including text, audio, or video communications. All communications between mobile devices 1-3 and an outside communication device (not shown) are routed by communication center 120. Services for monitoring and recording authorized communications via mobile devices 1-3 are also performed by, or on behalf of, correctional facility 110 at communication center 120.

Mobile devices 1-3 and communication center 120 connect via network 101 which includes a Local-Area Network (LAN), a Wide-Area Network (WAN), or the Internet, depending on the relative locations of communication center 120 and mobile devices 1-3. For example, communication center 120 may be located at a correctional facility where mobile devices 1-3 is located and therefore a LAN is used. In another example, communication center 120 is located at a different location than the correctional facility and therefore network 101 is a WAN or the Internet. In an embodiment, mobile devices 1-3 connects to the network 101 by way of an interface (not shown) such as a router or access point that is located at the correctional facility 110.

In an embodiment, interface 140a is configured to couple signals between mobile devices 1-3 and communication center 120. Interface 140a connects to mobile devices 1-3 via wireless technologies such as, but not limited to, Bluetooth®, WiFI, or radio frequency (RF) transmissions. Interface 140a connects to communication center 120 via wired technologies including, but not limited to, optical cables or RF cables and/or wireless technologies including, but not limited to, a LAN, a WAN, or the Internet. In an embodiment, interface 140a is an access point, a gateway, a router, a hotspot, or a hub. However, in an embodiment, one or more of the mobile devices 1-3 is configured to directly connect to the communication center 120 without the use of interface 140.

Mobile devices 1-3 are configured to detect and monitor communications by target device 150. Examples of target device 150 include a cellular phone, a network router, a hotspot, or any communication device. To do this, mobile devices 1-3 are configured to monitor different radio access technologies including, but not limited to, GSM, 2G-5G, WCDMA, CDMA, TDMA, UMTS, WIMAX, WIFI, IBEACON, Bluetooth, LTE, 700 mhz to 2200 mhz or other frequency bands, and/or other modes and frequencies. While monitoring a radio access technology, mobile devices 1-3 are configured to detect a transmission of a signal on the radio access technology from target device 150. For example, mobile device 1 may detect a carrier frequency of a transmitted signal from target device 150.

Mobile devices 1-3 are also configured to gather information from target device 150. Mobile devices 1-3 can gather information related to the target device 150 from content of the transmitted communication from target device 150 or if needed mobile devices 1-3 can perform additional steps to gather additional information. For example, mobile devices 1-3 are configured to utilize an RF transmission to gather information from target device 150. As an example, mobile devices 1-3 are configured to simulate a cellular tower, such as cellular tower 160, and thereby gather information from target device 150. Cellular tower 160 may be a macrocell, femtocell, a node, an access point or any other type of communication base station. To simulate a cellular tower, To simulate a cellular tower, mobile devices 1-3 are configured to transmit RF signals having a signal strength that exceeds a signal strength of the cellular tower. The signal strength of the cellular tower may be known by the mobile devices 1-3 or known based on results of a survey, as described in more detail below. When a mobile device (either mobile devices 1-3) transmits the RF signal, due to the strength of the RF signal, target device 150 is forced to disconnect from the cellular tower 160 and establish a connection with the mobile device. In this situation, the mobile device receives and transmits data between the target device 150 and the cellular tower 160. Once connection is established between target device 150 and the mobile device, the mobile device can gather information from target device 150 including identification information of the target device 150, such as the international mobile subscriber identity number (IMSI) or the electronic serial number (ESN), and information on the communication, such as a phone number of the outside communication device.

Mobile devices 1-3 are configured to compare the gathered information with stored data, as will be described below. Based on the results of the comparison, mobile devices 1-3 can determine whether target device is authorized to be used within the correctional facility or is contacting an authorized outsider.

Mobile devices 1-3 are configured to transmit information, as will be described in further detail below, to contraband monitoring center 130. Mobile devices 1-3 connect to contraband monitoring center 130, which provides additional monitoring and detection services in relation to unauthorized communications by target device 150. These additional services include the comparison of gathered data with stored data, the coordination of target device intervention measures, alerts, and/or notifications to one or more mobile devices 1-3, one or more fixed devices 4-5, and/or workers (not shown) at correctional facility 110. These services are likewise performed at the contraband monitoring center 130 by, or on behalf of, the correctional facility 110.

In an embodiment, interface 140b is configured to couple signals between mobile devices 1-3 and contraband monitoring center 130. Interface 140b connects to mobile devices 1-3 via wireless technologies such as, but not limited to, Bluetooth®, WiFI, or radio frequency (RF) transmissions. Interface 140b connects to contraband monitoring center 130 via wired technologies including, but not limited to, optical cables or RF cables and/or wireless technologies including, but not limited to, a LAN, a WAN, or the Internet. However, in an embodiment, one or more of the mobile devices 1-3 is configured to directly connect to the contraband monitoring center 130 without the use of interface 140b. In an embodiment, interface 140a is an access point, a gateway, a router, a hotspot, or a hub. In an embodiment, interface 140a and interface 140b are the same interface and configured to direct signals between mobile devices 1-3 and communication center 120 or contraband detection center 130 based on the information within the signals.

Mobile devices 1-3 are also configured to intervene between unauthorized communications and target device 150. In an embodiment, intervention operations by mobile devices 1-3 include transmitting a jamming signal of low RF strength that radiates within predetermined areas 10, 20, 30 about a location of the mobile devices 1-3. For example, the predetermined areas 10, 20, 30 may be jamming signals that radiate 10-15 meters in all directions around the mobile devices 1-3. Jamming signals include a signal that interferes or blocks a detected frequency or a signal that associates with the detected frequency. For example, the jamming signal may interfere with a downlink signal that is associated with a detected uplink signal of a cellular phone. Jamming signals include signals that have an increased power or signals that include a predetermined number of transmissions that overpower unauthorized communications. Jamming signals may also include signals that corrupt unauthorized communications. For example, mobile devices 1-3 can analyze packet headers transmitted by the target device 150 and transmit a signal that overwrites portions of the unauthorized communication such that packets of the unauthorized communication become corrupted.

In an embodiment, jamming signals are configured to not interfere with communications between mobile devices 1-3 and an outside communication device. To do this, mobile devices 1-3 emit jamming signals having a frequency band and/or radio access technology that is different from the frequency band and/or radio access technology used for communication between the mobile devices 1-3 and communication center 120.

Jamming signals are activated based on the detection of target device 150 and/or instructions received from contraband monitoring center 130. In doing so, mobile devices 1-3 preserve battery power. While the jamming signal is described as being dependent on the detection of target device 150, the present application is not limited as so, and may include an always on mode where such detection of the target device and the subsequent activation of the jamming signal is always transmitted by the mobile devices 1-3. In this mode, at least one of mobile devices 1-3 are configured to transmit a jamming signal when a main operating system (OS) of the mobile device is powered on, in sleep mode, and/or powered off. In other words, in this mode, jamming features are operated independently of the main processor power of the mobile device.

In an embodiment, intervention operations by mobile devices 1-3 also include a recording operation where audio and/or video is recorded by a mobile device at the time of detection. In this operation, mobile devices 1-3 are configured to activate their own microphone or camera to record communications and/or images of the area when target device 150 is detected. This allows a mobile device the ability to record actual conversations or capture visual confirmation of the unauthorized use of target device 150. Once recorded, the recorded audio/video data is transmitted from the mobile devices 1-3 to contraband monitoring center 130 to analyze the recorded audio/video data.

In an embodiment, intervention operations by mobile devices 1-3 further include a managed access point operation. For this, mobile devices 1-3 are configured to utilize an RF transmission to simulate a cellular transmission tower, as previously described. Once connection is established between target device 150 and one of the mobile devices 1-3, the mobile device can capture the content of the communication itself and record communications.

In an embodiment, intervention operations by mobile devices 1-3 also includes blocking or sending instructions to have communications from/to the target device 150. For example, during a managed access point operation, the mobile device is configured to act as an intermediary between the target device 150 and the cellular tower 160. In this example, the mobile device can capture communication information from intercepted communications between the target device 150 and the cellular tower 160 to gather information and then can completely block the target device 150 from receiving or transmitting communications to/from the cellular tower 160. In another example, the mobile devices 1-3 are configured to transmit identifying information (e.g., IMSI, ESN, and/or phone numbers) of the target device 150 to the contraband detection center 130 which, in turn, passes this information to a controller of the cellular tower 160 with a request for the target device 150 to be added on an exclusion list which blocks communications from/to the target device 150. In this embodiment, signals of the target device 150 are not jammed using radio frequencies. Rather, the signals are received by the respective access point, but dropped or otherwise prevented from being forwarded based on the device identification information associated with the signals.

In an embodiment, one or more of the mobile devices 1-3 is configured to perform a survey of transmitted frequencies from communication sources nearby correctional facility 110, for example cellular tower 160. Information gathered by the survey is then used to focus the detecting of transmissions from target device 150 based on the results of the search. For example, mobile device 1 can perform a survey to determine the uplink and downlink frequencies of cellular tower 160 and, based on results of the survey, can focus monitoring, detection, and jamming operations on the frequencies used by cellular tower 160.

As described above, mobile devices 1-3 operate individually by detecting target device 150, transmitting information to contraband monitoring center 130, and performing intervening operations. However, in an embodiment, mobile devices 1-3 are also configured to operate in a mesh infrastructure where mobile devices 1-3 communicate with each other and/or with fixed monitoring devices 4-5 to detect target device 150 and perform intervening operations. In this embodiment, each of the mobile devices 1-3 acts as a node in a mesh infrastructure where each of the nodes can communicate and even instruct the other node to perform operations such as performing a jamming operation, a recording operation, or a managed access operation. For example, as shown by FIG. 1, if mobile device 1 detects target device 150, mobile device 1 communicates this information to one or more of the mobile devices 2-3 and instructs one or more of these devices to output a jamming signal. In a mesh infrastructure, mobile devices 1-3 are able to perform intervention operations without the use of contraband detection center 130 or before receiving instructions from contraband detection center 130.

In an embodiment, mobile devices 1-3 use a change in location (motion data) to determine what intervention operations to perform and/or information to transmit between each other, fixed monitoring devices 4-5, and/or the contraband monitoring center 130. Mobile devices 1-3 can transmit motion data to other devices when target device 150 is detected and/or after a request to share motion data by another device. For example, after mobile device 1 detects target device 150, mobile device 1 shares motion data with mobile devices 2-3 and/or fixed monitoring devices 4-5 to indicate that it is moving away from target device 150 such that mobile devices 2-3 or fixed monitoring devices 4-5 can perform intervention operations. In another example, after mobile device 1 detects target device 150, mobile device 1 can poll other devices (e.g., mobile devices 2-3 or fixed monitoring devices 4-5) and receive location and motion data from these devices, if available, to determine whether any of these devices are or will be in close proximity to perform an intervention operation.

In an embodiment, fixed monitoring devices 4-5 are placed in locations, indoor or outdoor, throughout correctional facility 110. Fixed monitoring devices 4-5 may be a standalone device or combined with common electronics within correctional facility 110 such as a kiosk or a wireless access point. Fixed monitoring devices 4-5 are configured to perform all or some of the functions as the mobile devise 1-3, as described above, in detecting target device 150 and performing an intervening operation, as described above.

In an embodiment, one or more fixed monitoring devices 4-5 include a directional antenna to focus an RF signal at a particular area. Directional antennas of fixed monitoring devices 4-5 may be used to supplement areas of correctional facility 110 where mobile devices 1-4 are not typically allowed or difficult to access such as the yard or sparsely populated areas. These types of fixed monitoring devices 4-5 may be placed in areas such as fences around correctional facility 110 and directed towards the inside of the correctional facility 110 to avoid jamming issues with the public.

As shown by FIG. 1, fixed monitoring devices 4-5 connect to contraband monitoring center 130 by way of interface 140b. Connection to interface 140b is by wired technologies including, but not limited to, optical cables or RF cables and/or wireless technologies including, but not limited to, a LAN, a WAN, or the Internet. In an embodiment, one or more of the fixed monitoring devices 4-5 connects directly to contraband monitoring center 130 by way of the wired or wireless technologies, as previously discussed.

Similar to mobile devices 1-3, fixed monitoring devices 4-5 are configured to perform operations individually, or in a mesh infrastructure, where one of the fixed monitoring devices 4-5 provides or receives instructions from at least one of mobile devices 1-3, another one of fixed monitoring devices 4-5, and/or contraband monitoring center 130.

Mobile Device

Figure 2:
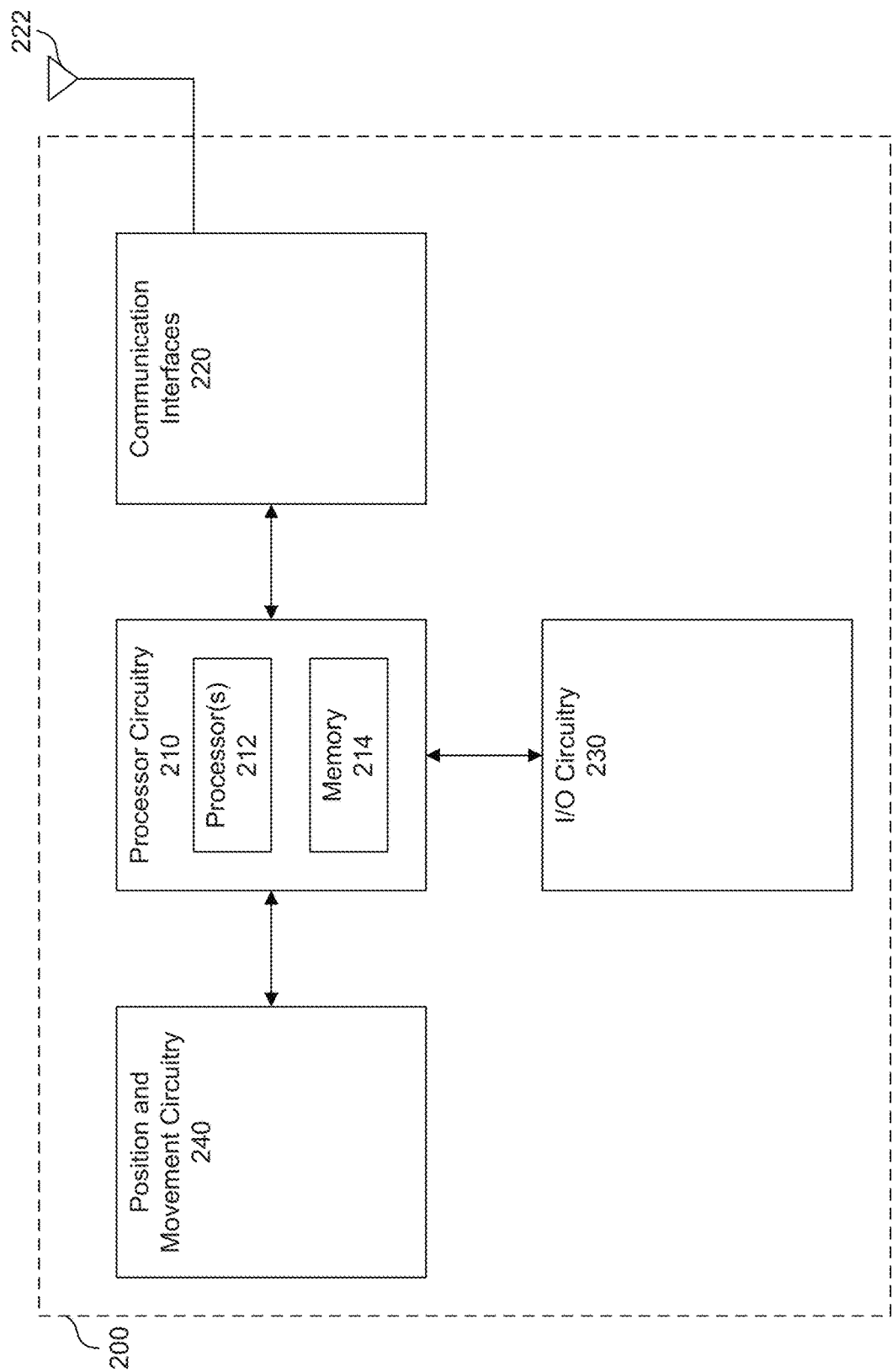
FIG. 2 illustrates a block diagram of a mobile device, according to embodiments of the present disclosure.

FIG. 2 illustrates a block diagram of mobile device 200, according to embodiments of the present disclosure. Mobile device 200 may be an exemplary embodiment of one or more of mobile devices 1-3. Mobile device 200 includes processor circuitry 210 that is communicatively coupled to plurality of communication interfaces 220, input/output circuitry 230, and positional and motion circuitry 240. Processor circuitry 210 includes one or more processors 212, circuitry, and/or logic configured to control the overall operation of mobile device 200, including the operation of communication interfaces 220, input/output circuitry 230, and positional and motion circuitry 240. Processor circuitry 210 further includes memory 214 to store data and instructions. Memory 214 may be any well-known volatile and/or non-volatile memory that is removable and/or non-removable.

Communication interfaces 220 include one or more transceivers, transmitters, and/or receivers that communicate via one or more antennas 222. Communication interfaces 220 are configured to transmit and receive communications between an inmate and an outsider via network 101. Communication interfaces 220 are also configured to detect transmissions by target device 150. Detection of target device 150 transmissions include reception of a communication of an unauthorized communication via one or more antennas 222. For example, to detect an unauthorized communication, a receiver of the communication interface 220 may cycle through different frequencies bands and/or radio access technologies. Communication interfaces 220 are further configured to output an RF signal during intervention operations. For example, a transmitter of the communication interfaces 220 may be configured to transmit an interference signal based on the received unauthorized communication. Lastly, communication interfaces 220 is configured to communicate with other mobile devices 1-3, fixed monitoring devices 4-5, and/or contraband monitoring center 130 to provide or receive information and/or instructions.

Input/output circuitry 230 includes circuitry such as a keypad, a touch interface, a microphone, a camera, and a video screen for displaying information. Input/output circuitry 230 may be used by a user for traditional mobile device communications such as audio, video, or texting communications. Input/output circuitry 230 such as the microphone and camera are used during intervention operation to capture audio and/or video of surrounding areas when a unauthorized communication is detected.

Positional and motion sensors 240 include circuitry for determining a current location and a change in location of mobile device 200. Positional and motion circuitry 240 may include such circuitry as Global Positioning System (GPS) technology, indoor positioning systems (IPS) technology, accelerometers, and/or gyroscopes to determine position and motion. Positional and motion sensors 240 are configured to triangulate a first current location of mobile device 200 based on signals received from, for example, positioning systems. Positional and motion sensors 240 are configured to determine whether mobile device 200 is in motion based on second location of the mobile device 200 and determining whether a change of location occurred between the first current location and the second current location.

Contraband Detection Center

Figure 3:
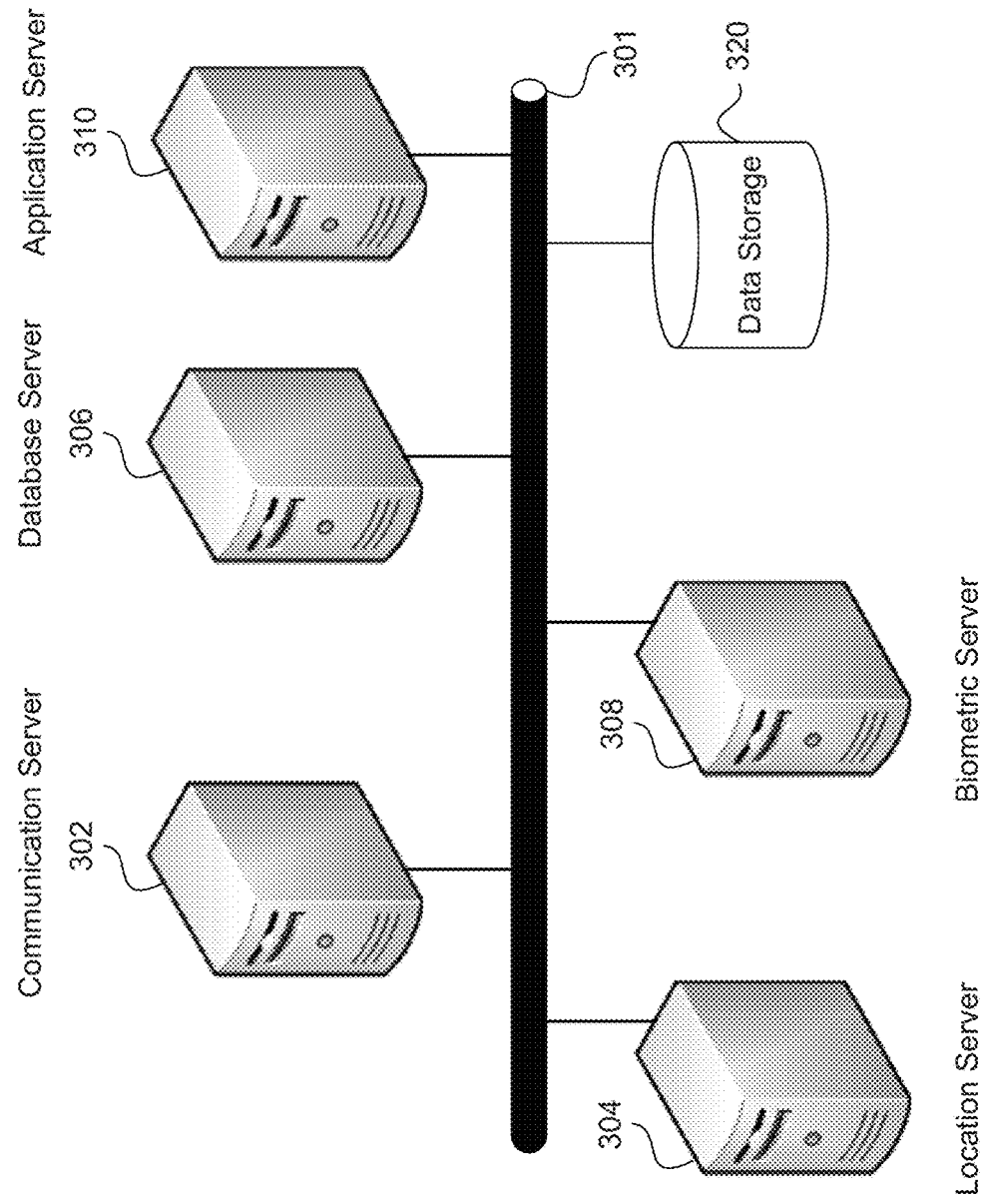
FIG. 3 illustrates a block diagram of a contraband monitoring center, according to embodiments of the present disclosure.

FIG. 3 illustrates a block diagram of contraband monitoring center 130, according to embodiments of the present disclosure. Contraband monitoring center 130 includes communication server 302, location server 304, database server 306, biometric server 308, application server 310, and data storage 320, that are all connected to each other via a network bus 301.

Each of the servers 302-310 can be constructed as individual physical hardware devices, or as virtual servers. The number of physical hardware machines can be scaled to match the number of simultaneous user connections desired to be supported detection and monitoring system 100.

Communication server 302 consists of any number of servers, and is configured to receive and transmit information to/from mobile devices 1-3, fixed monitoring devices 4-5, and/or interface 140. Communication server 302 receives information such as alerts, recorded audio/video data, and locations of devices at time of detection of target device and is configured to record and log the information. Because communication server 302 receives and transmits information by way of a network, in an exemplary embodiment, communication server 302 can encrypt and decrypt the information for security purposes.

Location server 304 consists of any number of servers, and is configured to receive location and motion data from one or more of mobile devices 1-3 and/or fixed monitoring devices 4-5. The location and motion data is used by location server 304 to determine a location and/or motion of target device 150, location and motion of devices 1-5 that are near a location of the detection of target device 150, and location and motion of devices 1-5 that are moving towards or away from the location of the detection of the target device 150. If location information is received from multiple devices, location server 304 can use the information to triangulate an accurate location of target device 150. Location information is received by location server 304 based any one or more of a request to one or more of the devices 1-5, a predetermined time for devices 1-5 to communicate respective location and motion data, or based on an event performed by one of the devices 1-5, for example detection of target device 150. Location server 304 is further configured to provide instructions to devices (e.g., mobile devices 1-3 and/or fixed monitoring devices 4-5) to perform intervention operations based on the received location information.

Database server 306 consists of any number of servers, and is configured to store and organize data in a relational database. Database server 306 is configured to run a database management system, such as MYSQL™, to provide an example. Database server 306 stores data related to correctional facility 110 such as locations of fixed monitoring devices 4-5, and/or interfaces 140a, 140b, past locations of detected target device 150, and whitelist and blacklist information, such as information (e.g., IMSI, ESN, and/or phone numbers) on devices authorized and/or unauthorized to be used within correctional facility 110 and devices/people authorized an/or unauthorized for communications with those from correctional facility 110. Examples of these lists may include a list of IMSI numbers of mobile devices of guards or correctional facility workers that are authorized to be used in the correctional facility, or an unauthorized called phone numbers list including phone numbers of witnesses, judges, or victims of crimes. The database server 306 is configured to share stored data with mobile devices 1-3 and fixed monitoring devices 4-5 for monitoring operations, as described below.

Biometric server 308 consists of any number of servers, and is configured to store biometric data of inmates. Biometric data includes at least one of voice data, facial recognition data (2D or 3D), device data. Biometric server 308 is configured to assist analyzing audio/video data received from mobile devices 1-3. Biometric server 308 assists by comparing received audio/video data against stored biometric data to determine identities of those near a device at the time of detection.

Data storage 320 provides access to a wide variety of data such as past location information, logs for alerts, notifications etc., audio/video information received from mobile devices 1-3, fixed monitoring devices 4-5, and/or interface 140, and/or database data. In general, data storage 320 stores any data stored by communication server 302, location server 304, database server 306, biometric server 308, and application server 310. Because the data stored on data storage 320 may consume a significant amounts of storage space, data storage 320 may include a Network Attached Storage (NAS) device, which is configured as a mass storage device. In order to reduce the required size, data storage 320 preferably includes a backup routine to transfer data to permanent storage devices, such as archival permanent storage or optical disks, after a predetermined time has elapsed since the initial recording of that data. Data storage 320 is connected to the servers 302-310 by way of the network bus 301.

Figure 4:
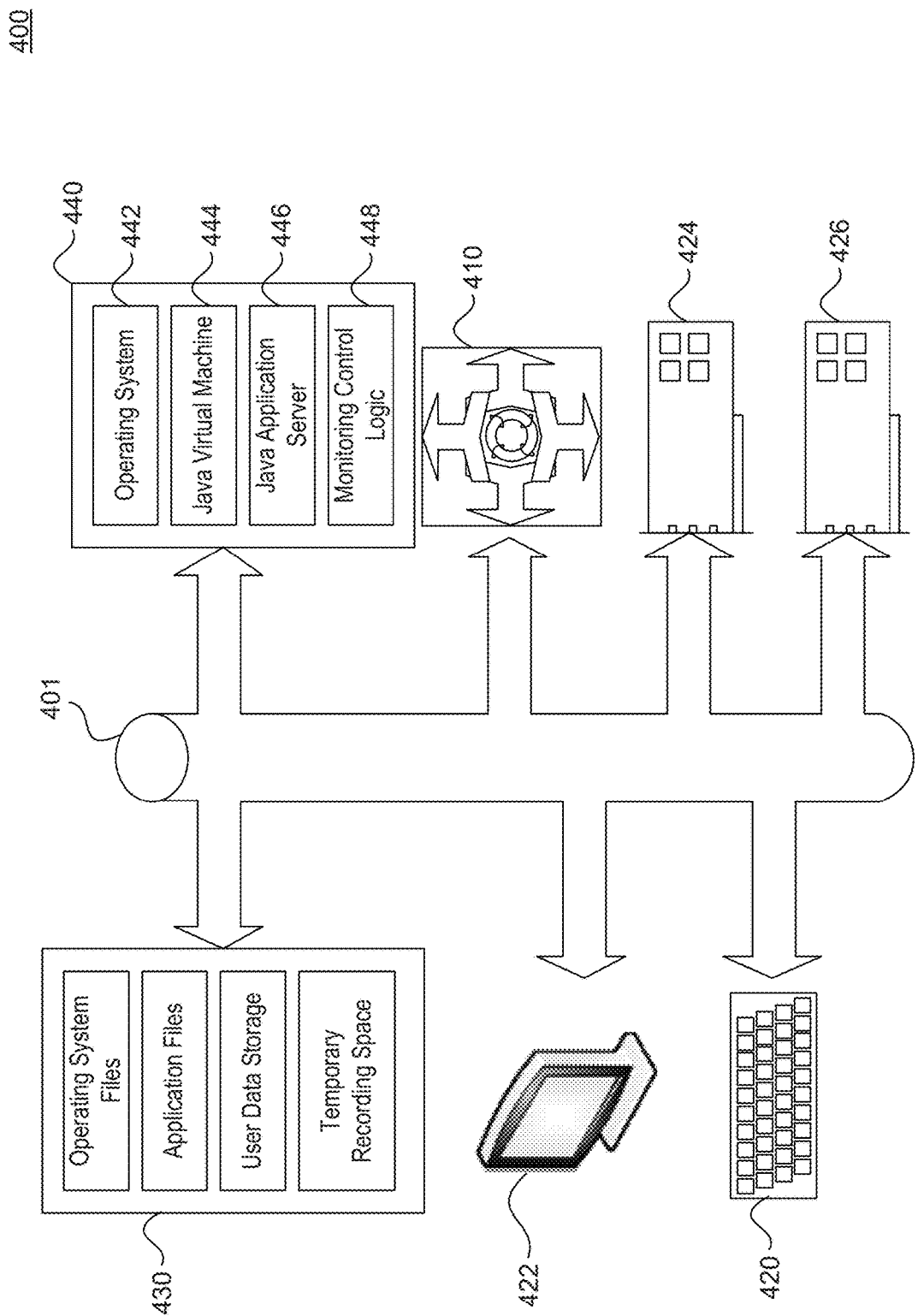
FIG. 4 illustrates a block diagram of an application server, according to embodiments of the present disclosure.

FIG. 4 illustrates application server 400, according to exemplary embodiments of the present disclosure. Application server 400 may represent an exemplary embodiment of the application server 310 depicted in FIG. 3. Application server 400 consists of any number of servers, and functions as the primary logic processing center in detection and monitoring system 100 such as coordinating a response to detection of target device 150. Application server 400 is configured to manage and facilitate communication between communication server 302, location server 304, database server 306, biometric server 308, and data storage 320.

Application server 400 includes one or more central processing units (CPU) 410 connected via a bus 401 to several other peripherals. Such peripherals include an input device, such as keyboard and/or mouse 420, monitor 422 for displaying information, network interface card 424 and/or modem 426 that provide network connectivity and communication.

Application server 400 also includes internal data storage 430. This data storage 430 is non-volatile storage, such as one or more magnetic hard disk drives (HDDs) and/or one or more solid state drives (SSDs). Data storage 430 is used to store a variety of important files, documents, or other digital information, such as operating system files, application files, user data, and/or temporary recording space.

Application server 400 also includes system memory 440. System memory 440 is preferably faster and more efficient than Data storage 430, and is configured as random access memory (RAM) in an embodiment. System memory 440 contains the runtime environment of application server 400, storing temporary data for any of operating system 442, java virtual machine 444, java application server 446, and detection and monitoring control logic 448.

System Operations

Operations of detecting, monitoring, and intervening in detection and monitoring system 100 will be described with respect to FIGS. 5-6. Although the physical devices and components that form the system have largely already been described, additional details regarding their more nuanced operation will be described below with respect to FIGS. 1-4. While FIGS. 5-6 contain methods of operation of detection and monitoring system 100, the operations are not limited to the order described below, and various operations can be performed in a different order. Further, two or more operations of each method can be performed simultaneously with each other.

Figure 5:
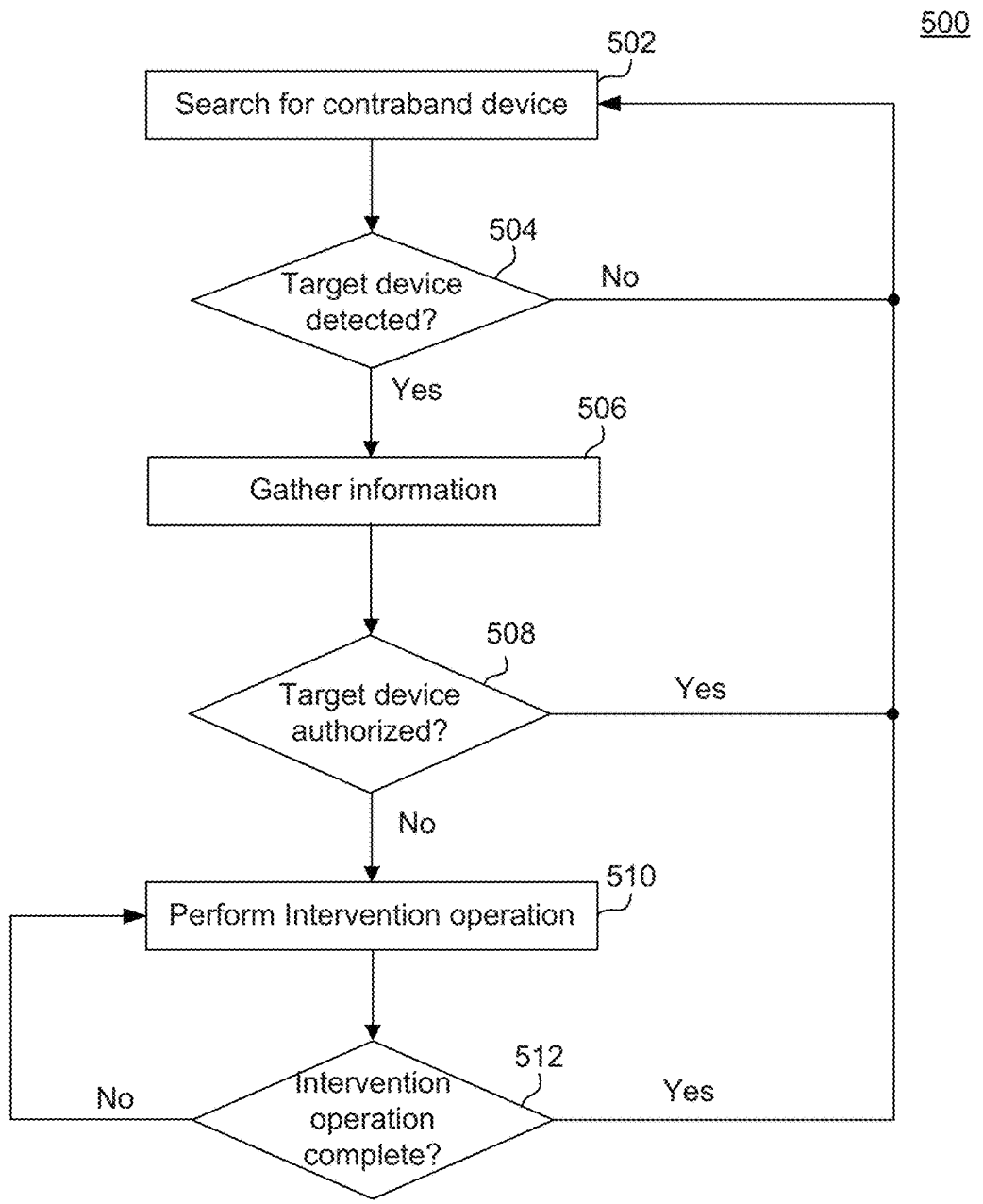
FIGS. 5-6 illustrate flowchart diagrams of methods of detecting and monitoring a contraband device, according to embodiments of the present disclosure.

FIG. 5 illustrates a flowchart diagram of a method of detecting and monitoring a contraband device, according to embodiments of the present disclosure. In step 502, a detecting device such as one of mobile devices 1-3 or fixed monitoring devices 4-5 search for a contraband device. When searching for a cellular device or hotspot, for example, the detecting device enables a receiver to receive transmissions. The detecting device may focus the receiver on specific types of transmissions such as GSM, CDMA, LTE, or other cellular transmissions and/or may rotate through a variety of frequencies and transmission types including, for example, cellular transmissions and WIFI signals of a specific type. In an embodiment, the detecting device performs a survey of frequencies from communication sources nearby correctional facility 110, for example cellular tower 160, as previously described. Based on the results of the survey, detecting device can determine what frequencies the search should focus on.

The detecting device next determines if a contraband device, such as target device 150, is detected in step 504. Detection is based on whether target device transmits a communication. However, it will be apparent to persons skilled in the relevant art that other methods for detecting target device 150 may be used. If target device 150 is not detected, the detecting device continues to search for a contraband device in step 502. Otherwise, when target device 150 is detected, the detecting device gathers information from target device 150 in step 506. Gathered information is retrieved by the detecting device simulating a cellular transmission tower, such as cellular tower 160, which has been previously described. Gathered information includes information such as an IMSI, an ESN, and/or a phone number of target device 150. In an exemplary embodiment, the gathered information also includes a phone number of a called device.

In step 508, the gathered information is used by the detecting device to determine whether target device 150 is authorized for use in correctional facility 110. Determination of whether target device 150 is authorized for use is based on the comparison of gathered information with stored data on the database server 306, such as IMSIs, ESNs, and/or phone numbers of devices authorized for use or blocked from use within correctional facility 110. As an example, the detecting device is configured to perform the comparison of the gathered information with stored data. The detecting device may obtain the stored data, such as a list of devices allowed for use in correctional facility 110, from database 306 by way of a request for the list or a pre-scheduled or automatic transmission of the list by the contraband detection center 130. As another example, the detecting device is configured to transmit the gathered information to the contraband detection center 130, where a comparison of the gathered information and stored data is performed, the results of which are transmitted to the detection device.

In an embodiment, the gathered information is used by the detecting device to determine whether target device 150 has contacted an authorized or blocked number from within correctional facility 110. For example, the detecting device is configured to compare the gathered information with a list of blocked telephone numbers. As another example the detecting device can transmit the gathered information to the contraband detection center 130 to perform the comparison. If the results of the comparison indicate that target device 150 is authorized and/or the called party are authorized, the detecting device searches for another contraband device, in step 502.

Otherwise, the detecting device performs an intervention operation, in step 510. Intervention operations include transmitting a jamming signal, performing a recording operation, performing a managed access point operation, and/or alerting, coordinating, or instructing other devices, such as mobile devices 1-3, fixed monitoring devices 4-5, and/or contraband detection device 130, regarding the target device 150 and/or intervention operations to perform.

In an embodiment, the detecting device transmits an alert to contraband monitoring center 130 to allow contraband monitoring center 130 to coordinate an intervention plan. The alert includes one or more of an indication that target device 150 has been detected, a time and a location of the detecting device when the detection occurred, or a motion of the detecting device since detection. If instructions are received from contraband monitoring center 130, the detecting device receives the instructions and performs the intervention operations.

Intervention operations continue until completed, in step 512. Completion of an intervention operation may be determined based on one or more of a predetermined time since an intervention operation began or motion information indicating that the device has moved. The predetermined time is determined based on the intervention operation performed. For example, the predetermined time may be an arbitrary time for transmitting a jamming signal. As another example the predetermined time may be a sufficient amount of time to sample an audio or video recording, or receive data from the contraband device when performing managed access operation.

If determined that the intervention operation is complete, the detecting device searches for another contraband device in step 502. Otherwise, the detecting device continues to perform the intervention operation, in step 510.

Figure 6:
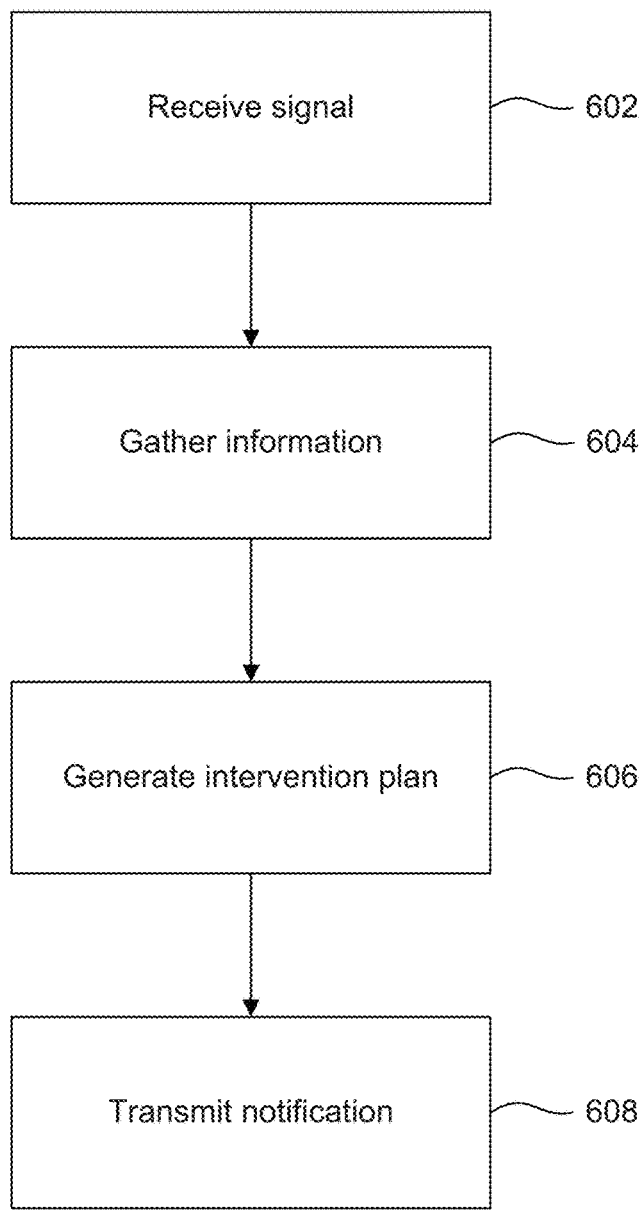

FIG. 6 illustrates a flowchart diagram of a method of detecting and monitoring a contraband device, according to embodiments of the present disclosure. In step 602, contraband monitoring center 130 receives an alert from one or more of mobile devices 1-3 or fixed monitoring devices 4-5. The alert includes a time and a location of the one or more of mobile devices 1-3 or fixed monitoring devices 4-5 when detection of target device 150 occurred. Once received, contraband monitoring center 130 gathers additional data to generate an intervention plan. Gathering additional information may include polling one or more of mobile devices 1-3 or fixed monitoring devices 4-5 near the location information received and requesting location information, motion information, and/or detection information. Additional information may also include gathering information on locations or availability of prison workers and/or capabilities of mobile devices 1-3 or fixed monitoring devices 4-5. Next, contraband monitoring center 130 generates an intervention plan which coordinates one or more intervention operations to be performed to intercept, locate, and/or gather information from target device 150. After the contraband monitoring center 130 generates the intervention plan, instructions are transmitted to those mobile devices 1-3, fixed monitoring devices, or workers designated to perform intervention operations.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
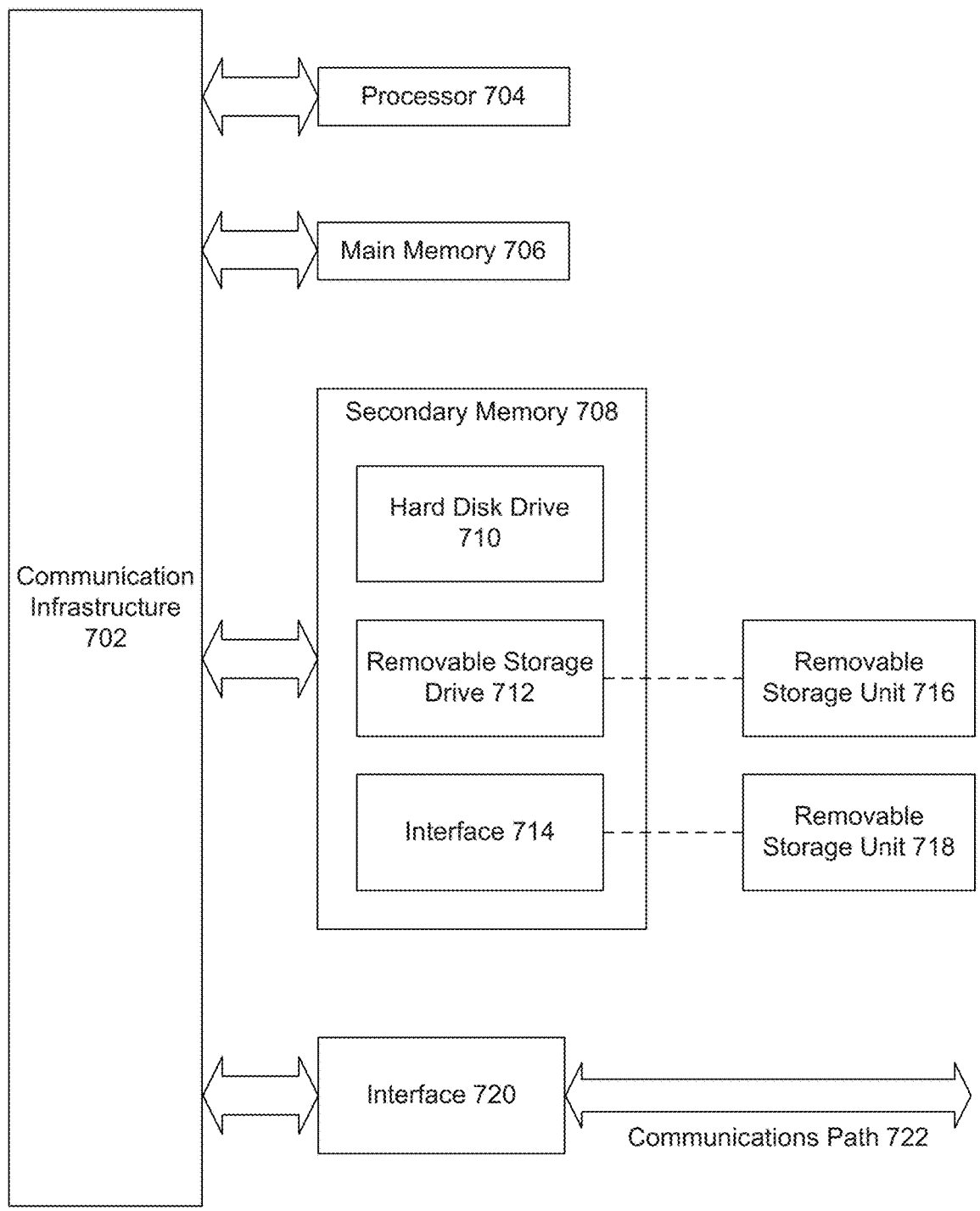
FIG. 7 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIGS. 5-6 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for detecting and monitoring a target device used in a facility, the system comprising:
   a communication network;
   a contraband detection center comprising one or more processors; and
   a mobile device comprising:
      one or more processors configured to:
         establish a connection with the target device;
         detect transmissions from the target device communicating on the communication network;
         gather information regarding the target device based on the detected transmissions; and
         transmit an alert to the contraband detection center, wherein the alert comprises a time of detection and a location of the mobile device upon detection of the target device;
   wherein the one or more processors of the contraband detection center are configured to:
      receive the alert from the mobile device upon detection of the target device;
      decrypt the alert from the mobile device;
      obtain additional information from the mobile device;
      generate an intervention plan based on the additional information; and
      transmit instructions comprising the intervention plan to the mobile device or a fixed monitoring device, wherein the instructions are encrypted before transmission over the communication network.

2. The system of claim 1, wherein the information gathered regarding the target device comprises an international mobile subscriber identity number (IMSI), an electronic serial number (ESN), a phone number of the target device, or a phone number of a called device.

3. The system of claim 2, wherein the additional information obtained by the contraband detection center comprises the information gathered regarding the target device by the mobile device.

4. The system of claim 1, wherein the additional information comprises at least one of location information, motion information, detection information, and availability information of workers in the facility to perform the intervention plan.

5. The system of claim 1, wherein the one or more processors of the mobile device are further configured to obtain identifying information of the target device based on the detected transmissions.

6. The system of claim 1, wherein the one or more processors of the mobile device are further configured to determine whether the target device is authorized to communicate within the facility on the communication network.

7. The system of claim 1, wherein the intervention plan comprises one or more intervention operations to be performed to intercept, locate, or gather information from the target device.

8. A mobile device for detecting and monitoring a target device in a facility, the mobile device comprising:
   one or more transceivers configured to transmit and receive communications on two communication networks; and
   one or more processors configured to:
      establish a connection with the target device;
      detect transmissions from the target device communicating on one of the two communication networks;
      gather information regarding the target device based on the detected transmissions;
      transmit an alert to a contraband detection center, wherein the alert comprises a time of detection and a location of the mobile device upon detection of the target device, and wherein the alert is decrypted upon receipt at the contraband detection center; and
      receive and perform instructions comprising an intervention plan from the contraband detection center.

9. The mobile device of claim 8, wherein the one or more processors of the mobile device are configured to establish the connection with the target device by transmitting signals that simulate a cellular tower.

10. The mobile device of claim 8, wherein the information gathered regarding the target device comprises an international mobile subscriber identity number (IMSI), an electronic serial number (ESN), a phone number of the target device, or a phone number of a called device.

11. The mobile device of claim 8, wherein the one or more processors of the mobile device are further configured to obtain identifying information of the target device based on the detected transmissions.

12. The mobile device of claim 8, wherein the one or more processors of the mobile device are further configured to determine whether the target device is authorized to communicate within the facility on the one of the two communication networks.

13. The mobile device of claim 8, wherein the intervention plan comprises one or more intervention operations to be performed to intercept, locate, or gather information from the target device.

14. The mobile device of claim 13, wherein the one or more intervention operations comprise a jamming signal to block communications from the target device, a managed access operation to intercept communications from or to the target device, or an audio or video recording from the mobile device.

15. A method for detecting and monitoring a target device used in a facility, the method comprising:
    establishing, by one or more processors of a mobile device, a connection with the target device;
    detecting, by the one or more processors of the mobile device, transmissions from the target device communicating on a communication network;
    gathering, by the one or more processors of the mobile device, information regarding the target device based on the detected transmissions;
    transmitting, by the one or more processors of the mobile device, an alert to a contraband detection center, wherein the alert comprises a time of detection and a location of the mobile device upon detection of the target device;
    receiving, by one or more processors of the contraband detection center, the alert from the mobile device upon detection of the target device;
    decrypting, by the one or more processors of the contraband detection center, the alert from the mobile device;
    obtaining, by the one or more processors of the contraband detection center, additional information from the mobile device;
    generating, by the one or more processors of the contraband detection center, an intervention plan based on the additional information; and
    transmitting, by the one or more processors of the contraband detection center, instructions comprising the intervention plan to the mobile device or a fixed monitoring device, wherein the instructions are encrypted before transmission over the communication network.

16. The method of claim 15, wherein the information gathered regarding the target device comprises an international mobile subscriber identity number (IMSI), an electronic serial number (ESN), a phone number of the target device, or a phone number of a called device.

17. The method of claim 15, wherein the additional information obtained by the contraband detection center comprises the information gathered regarding the target device by the mobile device.

18. The method of claim 17, wherein the additional information comprises at least one of location information, motion information, detection information, and availability information of workers in the facility to perform the intervention plan.

19. The method of claim 15, further comprising:
    obtaining, by the one or more processors of the mobile device, identifying information of the target device based on the detected transmissions.

20. The method of claim 15, further comprising:
    determining, by the one or more processors of the mobile device, whether the target device is authorized to communicate within the facility on the communication network.

* * * * *